EMMA E. O. WARNER.
Baking-Pans.
No. 156,470. Patented Nov. 3, 1874.
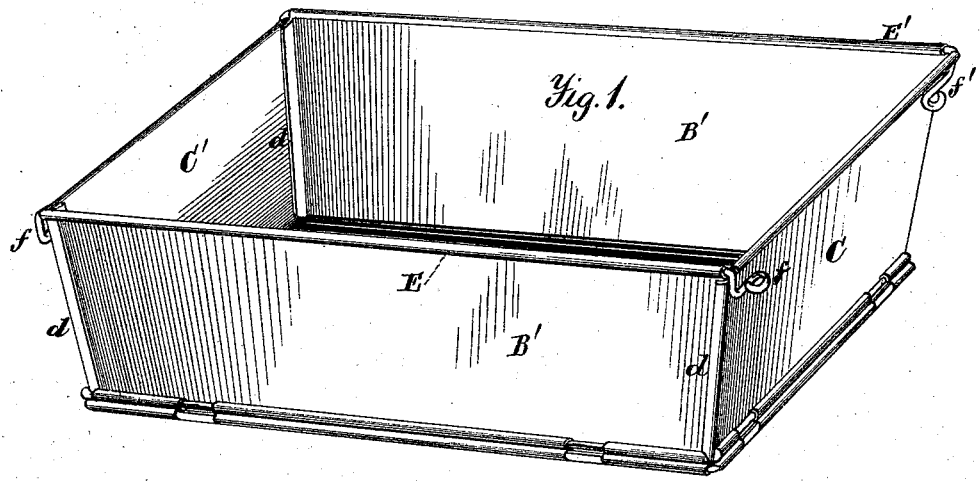
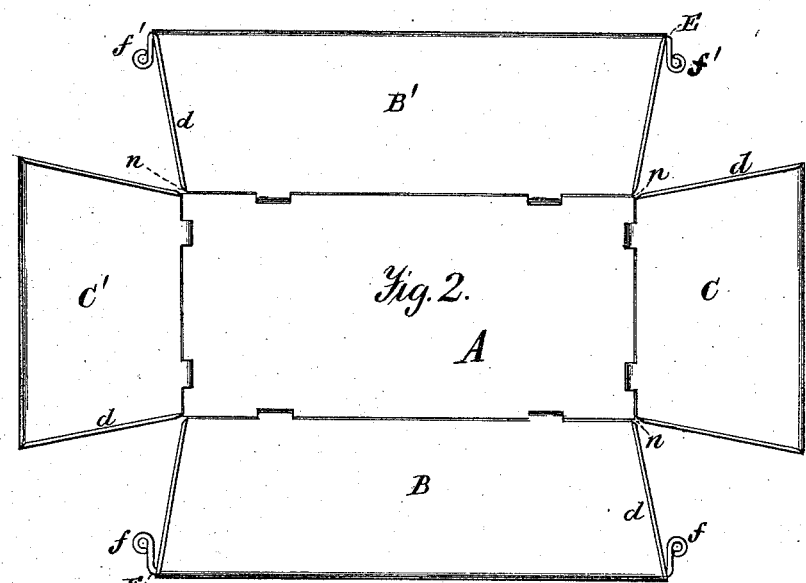
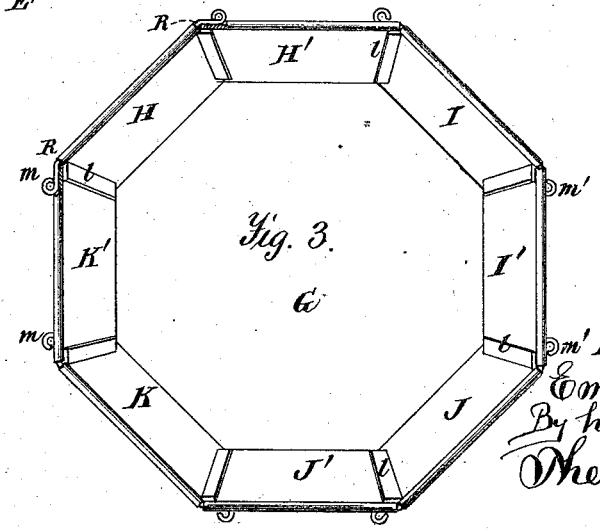
Witnesses.
A. Ruppert.
F. L. Perley.
Inventor:
Emma E. O. Warner
By her Attorney
Theo. Mungen

UNITED STATES PATENT OFFICE.

EMMA E. O. WARNER, OF DENVER, COLORADO TERRITORY.

IMPROVEMENT IN BAKING-PANS.

Specification forming part of Letters Patent No. 156,470, dated November 3, 1874; application filed September 7, 1874.

*To all whom it may concern:*

Be it known that I, EMMA E. O. WARNER, of Denver, in the county of Arapahoe and Territory of Colorado, have invented a new and useful Improvement in Baking-Pans; and I hereby declare the following to be a full, clear, and exact description of the same, reference being had to the accompanying drawings, making a part of this specification, in which—

Figure 1 is a view, in perspective, of a pan embodying my improvements. Fig 2 is a plan view of the same when opened out, and Fig. 3 is a plan view of a modification of my improvement.

This invention relates to an improvement in baking-pans for baking cake, bread, &c.; and it consists of a pan having the portion surrounding the bottom to form the sides and ends or circumference constructed in sections, hinged to the bottom, and the wire in the upper edges of alternate sections sufficiently loose to turn therein, the ends of said wire in said alternate sections being provided with clasps or clamps for binding the adjacent sections together when they are turned up in contact preparatory to charging the pan with its contents for baking; the object of the invention being to permit the sections forming the circumference to be let down for the purpose of removing the baked contents of the pan without breaking the same, as will hereinafter more fully appear.

In the accompanying drawing, the bottom A of a square pan has its edges wired. The sections B B' and C C' have their upper and lower edges wired, and are hinged to the bottom A. The end edges of each of the sections B B' C C' are provided with flanges $d$, which, when the sections are turned up and brought in contact to form the circumference of the pan, unite and form tight unsoldered seams. The wires E E' in the upper edges of the sections B B' turn in their bearings, and are provided with the clasps or clamps $f f'$, one at each end, which, when turned inwardly, bind the several sections together, thus forming the pan.

Fig. 3 shows an application of my invention to an octagonal pan, in which the bottom G is wired, as is A. The upper and lower edges of the sections H H', I I', J J', and K K' are wired, and the said sections hinged to G. The end edges of said sections are provided with flanges $l$, which, when the sections are turned up to form the pan, unite and form tight unsoldered seams. The wires R in the upper edges of the alternate sections H I J K turn in their bearings, and are provided with clasps or clamps $m\ m'$, which, when turned inwardly, bind the adjacent sections firmly together, and thus form an octagonal pan.

The construction of the two pans is the same, the form only being different. The hinges at the bottom leave a small air-space, $n$, between the lower edges of the sections and the upper surface of the bottom. The air-space $n$ is not large enough to permit the contents of the pan to escape, but is large enough to permit air to enter and prevent the contents from being burned.

The operation of the invention is very simple. The contents of the pan having been baked, it is only necessary to turn the clasp $f f'$ or $m\ m'$ outwardly and lower the sections, when the contents can be removed without breaking.

Having thus described my invention, what I claim as new and useful, and desire to secure by Letters Patent, is—

In a baking-pan in which the portion surrounding the bottom to form the sides and ends or circumference is constructed in sections, hinged to the bottom of the pan, the combination of flanges on the end edges of each section with clasps at the ends of the upper wired edges of alternate sections, operating substantially as and for the purposes set forth.

In testimony that I claim the foregoing improvement, as above described, I have hereunto set my hand and seal this 28th day of August, 1874.

EMMA E. O. WARNER. [L. S.]

Witnesses:
 DANIEL SAYER,
 J. P. WARNER,
 D. C. LIONBERGER.